Oct. 13, 1931.  P. J. SIMMEN  1,827,406

SYSTEM FOR CONTROLLING MOVING VEHICLES COMPRISING MULTIPLE SIGNALS

Original Filed March 13, 1915   4 Sheets-Sheet 4

Attest:
Helen V. Fitzpatrick
Alda L. Miller

Inventor:
Paul J. Simmen
by William R. Baird
his Atty.

Patented Oct. 13, 1931

1,827,406

UNITED STATES PATENT OFFICE

PAUL J. SIMMEN, OF EDEN, NEW YORK, ASSIGNOR TO SIMMEN AUTOMATIC RAILWAY SIGNAL COMPANY, OF EDEN, NEW YORK, A CORPORATION OF ARIZONA

SYSTEM FOR CONTROLLING MOVING VEHICLES COMPRISING MULTIPLE SIGNALS

Application filed March 13, 1915, Serial No. 14,075. Renewed January 28, 1927.

This invention relates to an apparatus for automatically controlling the speed of a vehicle moving along a railway, and its novelty consists in the construction and adaptation of the parts as will be more fully hereinafter pointed out.

I am the inventor of a railway signal apparatus, comprising a succession of signal rails, arranged at intervals along the railway, means for energizing such rails, positively or negatively, or deenergizing them, controlled from switches preferably located at a central point, as a train dispatcher's office, means for interlocking the switches under certain conditions to promote safety; clear and danger, or clear, caution and danger, signals, carried on a car moving along the railway, and which signals are actuated or controlled as electrical impulses are received or not received through the signal rails; a holding circuit on the car energized from a local battery whereby any particular signal on the car set up by contact with the signal rail is maintained until the car reaches another signal rail; together with proper electrical connections and devices not necessary now to be described. I am also the inventor of an automatic speed controlling apparatus comprising means on a car for indicating its actual speed and means for indicating a permissible speed, the latter being set into operation when danger conditions supervene and have been indicated by the energization, or lack of energization, of the signal rails or certain electrical devices on the car. This apparatus is so arranged that when the permissive speed indicator is actuated it moves in effect to generate a speed reducing curve and at all points along such curve the operator must keep the actual speed of the vehicle below the indicated permissible speed or through appropriate mechanism the brakes on the car are set to retard its motion. This apparatus is also accompanied by various electrical and mechanical adjuncts not necessary to be described in this connection.

The object of the present invention is to so combine the described signal system and speed controlling device with other mechanism and appliances that when a clear signal is indicated on a car, the permissive speed indicator does not come into play unless a maximum indication is exceeded. When this happens, the brakes are automatically put on and the vehicle retarded. When danger conditions are indicated on the car the permissive speed indicator is automatically actuated to indicate a constantly diminishing rate of speed which the operator may not exceed without the brakes being automatically put on. When a caution signal is indicated on the car a permissive speed indicator is automatically moved to a sub-maximum position, and remains there unless danger conditions are indicated when it is then automatically actuated to indicate a constantly diminishing rate of speed; or unless clear conditions are indicated when it is automatically restored to its initial maximum position. The devices necessary to accomplish these purposes are employed in combination with means for arresting the speed of the car at a minimum position of the permissive speed indicator, which may be varied to suit varying conditions of operation or equipment. There is also provided a warning signal to notify the operator on the car that his actual speed is approximating the limit of his permissible speed and there is also provided sundry other convenient devices as hereinafter described.

In the drawings, there is illustrated a preferred form of apparatus embodying my invention, the parts being shown mostly in diagram for the sake of promoting the clearness in the description.

In the drawings, 1 indicates one of the traction rails of an ordinary railway. Along the track at suitable intervals there are arranged signal rails, one of which is indicated at 2, which rails may be at stations or other convenient places. Usually at each station, there are two rails, a distant rail and a home rail. Each rail is suitably supported and insulated and is adapted to be energized positively or negatively or deenergized by means of suitable switch controlled conductors operated from a central point as a train dispatcher's office. A general system of this nature is described in my co-pending application for Letters Patent of the United States, Serial No. 866,639, (Patent 1,192,235, July 25, 1916), and has been described in connection with a number of Letters Patent of the United States issued to me. In the drawings for the purposes of illustration I have shown a battery 97 connected to the ordinary and well known pole changing switch 98 which may be operated in any desired manner by rod 99 so that the polarity of current supplied to wire 100 connected to ramp 2 and to wire 101 connected to rail 1 may be reversed or the current may be entirely cut off.

One of the wheels of a car adapted to move along the railway is indicated at 3, its axle at 4, and the ordinary train pipe air valve controlling the brake system at 5.

A shoe 6 is hingedly mounted at a convenient place on the car and is adapted to engage the successive signal rails as it moves along the railway, during such engagement pressing against the spring 7 and when out of such engagement being pressed by that spring against a projecting arm or contact 8.

Mounted on a car at a suitable place is a polarized relay 10, having two armatures, viz., a neutral armature 11 pivotally mounted adjacent to it and which is adapted to touch two front contacts 12 and 13 and a back contact 14, and a polarized armature 100 adapted to actuate fingers 15 and 16 to touch contacts 17, 18 and 19 and fingers 150 and 160 to touch contacts 151 and 161. A local battery indicated at 20 is also carried on the car and there are three signal lights, viz., a clear signal or green light 21, a caution signal or yellow light 22, and a danger signal or red light 23.

Also mounted on the car is a centrifugal governor 30, having a shaft 31 to which motion is imparted by gears 32 from the wheel axle 4. The ball frame 34 of the governor has secured to it a sleeve 35, slidable on the shaft 31 and provided with an annular flange 36. The shaft is also provided with gears 37 and 38, each meshing with a gear 39 secured to a shaft 40, and between the gears there is arranged a sleeve 41, indented at each end in opposite directions to engage similarly indented annular flanges on the gears 37 and 38. By this construction the shaft 40 is always rotated in the same direction no matter in which direction the shaft 31 is rotated.

A shaft 45 is mounted in suitable bearings indicated at 46 adjacent to the governor. Near one of its ends there is secured to it a speed control cam indicated at 47 and at its opposite end a gear 48 and on the gear a wing 49. At a convenient point on the shaft there is provided a sleeve 50 carrying a Z-armature 51 and recessed at 52 to co-operate with a detent 54 on the shaft. A spring 55 and cord 56 serve to restore the shaft to its original position when it has been rotated against the tension of the spring. Detents 57 and 58 are adjustably and suitably mounted near the gear 48 and arranged in the circular path of the wing 49 to limit the extent of the movement of the shaft 45. The shaft 45 is moved from the governor shaft 31 and shaft 40 by means of a power transmitting mechanism including a clutch indicated at 60, a shaft 25 supported upon and carried by bearing 61, and a pinion 62 adapted to mesh with the gear 48. The clutch comprises a disc 63 arranged within a sleeve 64 and which disc is pressed by a spring 65 against a similar disc 66 arranged on one member 67 of a universal joint, the other member 68 of which is secured to the shaft 25. The two disc members are adapted to slip and yield when occasion requires. The bearing 61 is suspended from an arm 69 swung upon a pivot 70 and which arm is the armature of an electromagnet 71.

Adjacent to the train pipe air release valve 5 there is arranged an electromagnet 75 having an armature 76 pivoted at 77 and adapted to compress a spring 78 normally adapted to hold open the valve 5 controlling the air pipe 72 leading to the brake system. 80 is a bell adapted to be rung through the energization of an adjacent electromagnet 81 in the usual manner.

Hingedly mounted near the cam 47 is an arm 85 carrying a roller 86 with which the edge of the cam is adapted to contact. A coil spring 87 serves to promote such contact and to elevate the arm when the cam is restored to its original position. At its end opposite the hinge the arm 85 is provided with a pivoted fork 88 made in part of suitable insulating material and adapted to pass on each side of the sleeve 35 but to contact with the flange 36 if the parts are relatively moved a sufficient distance. The arm 85 also carries a supplemental arm 89 made of insulating material and two contact members 90 and 91 adapted to co-operate with two other contact members 92 and 93 carried by the fork 88. These contacts constitute a make and break device and are so arranged that when the fork 88 and the flange 36 touch each other and the fork 88 is lifted, a circuit is made through the contacts 91 and 93 and then immediately thereafter another circuit is broken through the separation of the contacts 90 and 92. These contacts are all adjustably secured in any convenient manner to vary their relative positions so as to vary the times of making and breaking the circuit.

Two coils 95 and 96 are mounted to control the Z-armature 51, which is preferably acted upon by a slow acting magnet.

Different electrical conductors or wires connect the described parts and being designated by the lower case letters of the alphabet will be referred to as the operation of the apparatus is described.

The signal rail 2 may be positively or negatively energized or deenergized. First let it be assumed that it is positively energized, that the shoe 6 has moved into contact therewith and has been lifted to break the connection between the shoe and the contact 8. A circuit is then completed from the source of energization of the rail 2 through the shoe 6, wire $a$, relay 10, and wires $b$ and $c$ to the ground. When the shoe leaves the signal rail, a holding circuit on the car keeps the relay 10 energized from the local battery 20 as follows: from the positive side of the battery to the wire $d$, contact 17, finger 15, wire $e$, armature 11, contact 12, wire $g$, contact 8, shoe 6, wire $a$, relay 10, wire $h$, finger 16, contact 18 and wire $i$ to the negative side of the battery. At the same time the energization of the relay 10, either from the signal rail 2 or the battery 20, causes the green lamp or clear signal to glow because of the following circuit; from the positive side of the battery 20 to the wire $d$, contact 17, finger 15, wire $e$, armature 11, contact 13, wire $j$, finger 150, contact 151, wire $k$, green light 21, wire $l$, wire $c$, wire $b$, wire $h$, finger 16, contact 18, and wires $i$ and $m$ to the negative side of the battery.

The energization of the relay 10, also causes the energization of the relay 71, through the following circuit: from the positive side of the battery 20 to the wire $d$, contact 17, finger 15, wire $e$, armature 11, contact 12, wire $f$, wire $n$, relay 71, wire $o$, wire $h$, finger 16, contact 18, and wires $i$ and $m$ to the negative side of the battery. Also if the two contacts 90 and 92 touch, a circuit from the battery 20 energizes the electromagnet 75, the current passing as follows: from the positive side of the battery to the wire $d$, wire $p$, contact 92, contact 90, wire $q$, magnet 75, wire $r$, and wires $s$ and $m$ to the negative side of the battery.

Figure 1:
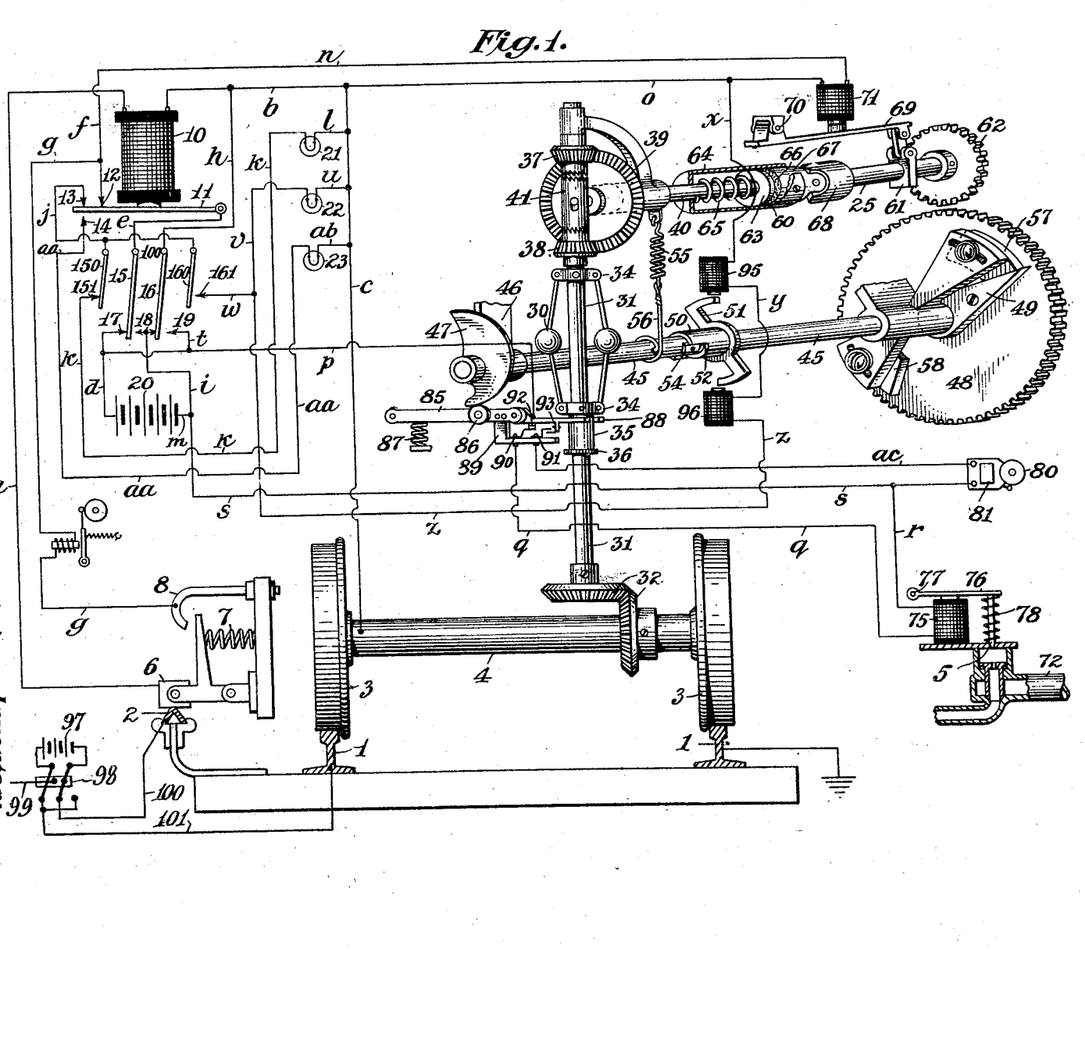
Figure 1 illustrates the position of the parts when a clear signal is indicated on the car and the function of the power-transmitting mechanism to the permissive speed indicating device is interrupted.
Figure 2:
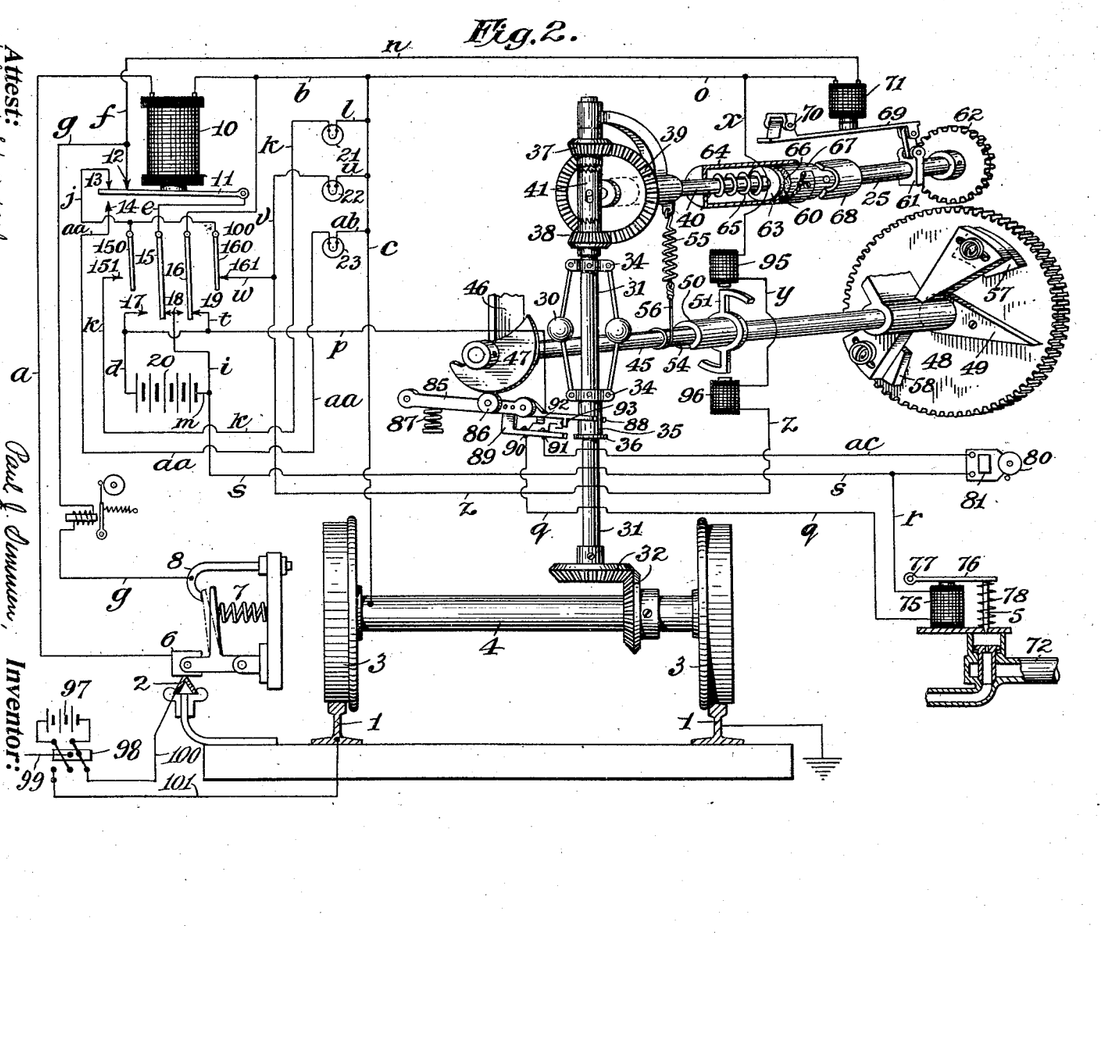
Figure 2 illustrates the positions of the same parts when a caution signal is indicated on the car.
Figure 3:
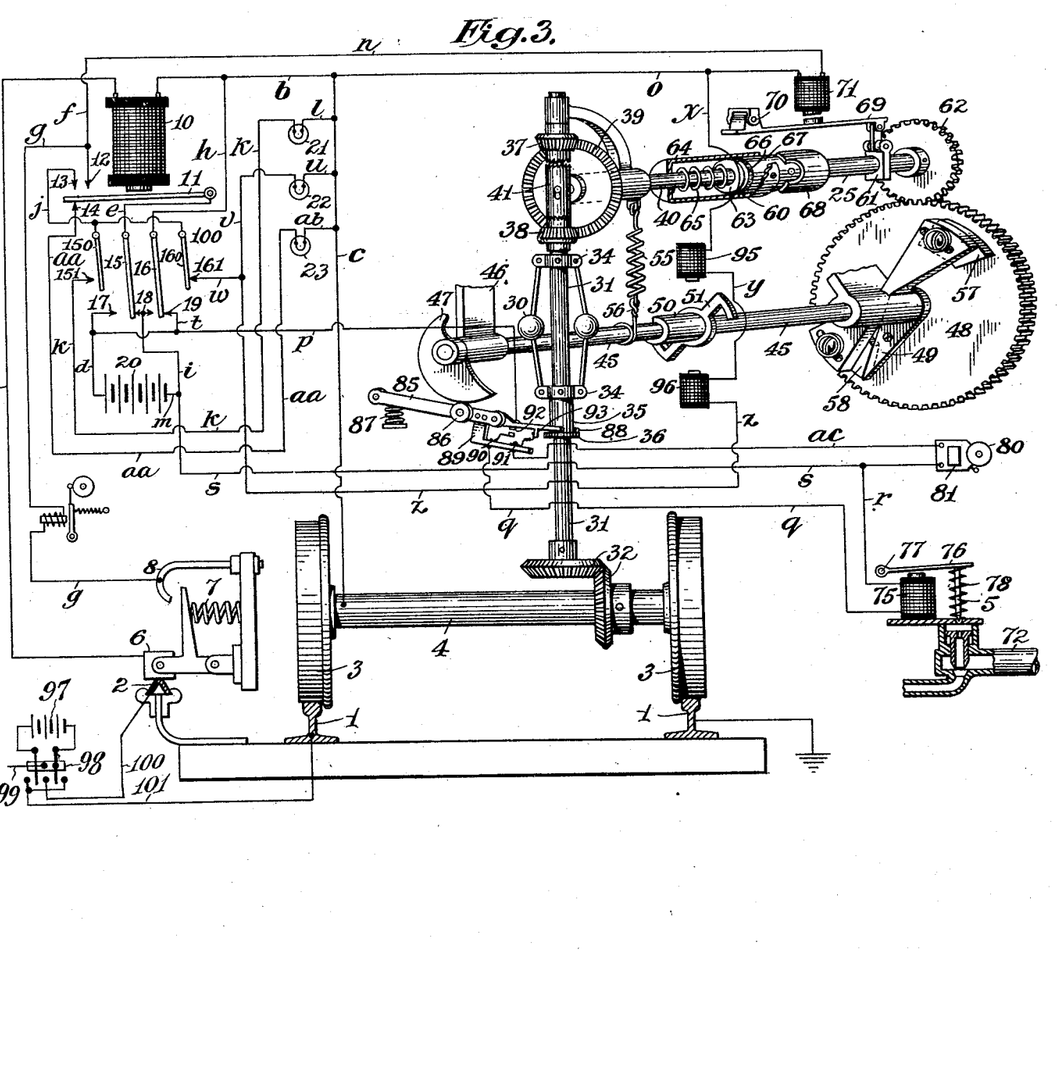
Figure 3 illustrates the positions of the same parts when a danger signal has been indicated on the car, the permissible speed indicator has been moved, and the actual speed indicator has indicated an identical speed and the retarding mechanism has been actuated.
Figure 4:
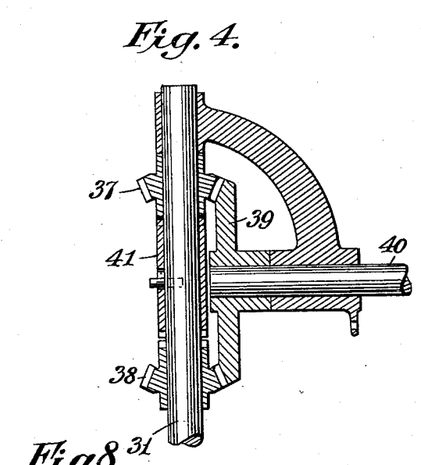
Figure 4 is an enlarged sectional detail of the gearing intermediate the governor shaft and the pinion shaft clutch.
Figure 5:
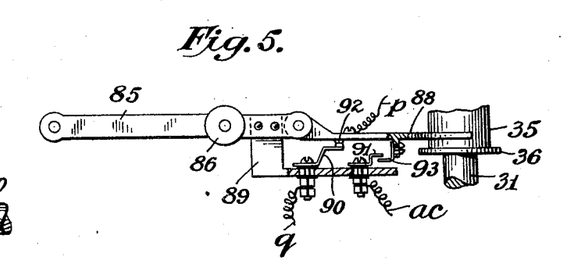
Figures 5, 6 and 7 are enlarged details showing the successive positions of the permissive speed indicating arm as the governor sleeve flange moves upward to make and break the circuits through the contact points on the arm.
Figure 6:
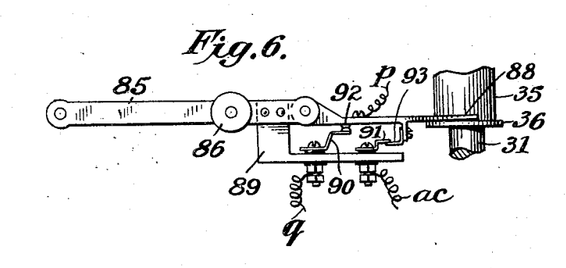
Figure 7:
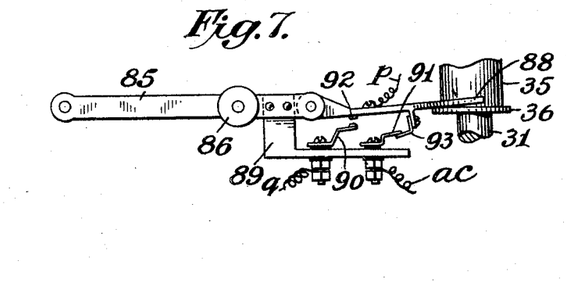
Figure 8:
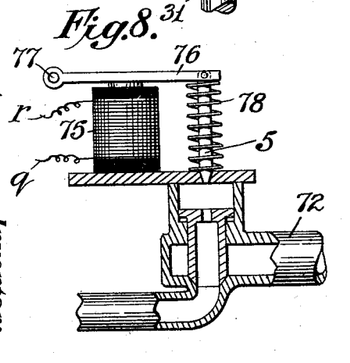
Figure 8 is an enlarged detail of the train pipe air valve and its connections.

If the signal rail 2 is negatively energized, the relay 10 is energized through the same circuit as before, but the fingers 15 and 16 and 150 and 160 of the polarized armature, instead of taking the position shown in Figure 1, take the position shown in Figure 2. When the signal rail is negatively energized, and the shoe 6 leaves it, the holding circuit for the relay 10 is as follows: from the positive side of the battery 20 to the wire $d$, wire $p$, contact 19, finger 16, wire $h$, wire $b$, relay 10, wire $a$, shoe 6, contact 8, wire $g$, wire $f$, armature 11, wire $e$, finger 15 and wires $i$ and $m$ to the negative side of the battery. This holding circuit is the same as that which obtained when the signal rail was positively energized except that the flow of the current through the coils of the relay is in the opposite direction.

The negative energization of the relay in the manner stated also causes the caution signal consisting of the yellow light 22 to glow by reason of the establishment of the following circuit: from the positive side of the battery 20, to the wire $d$, wire $p$, wire $t$, contact 19, finger 16, wire $h$, wire $b$, wire $c$, wire $u$, yellow light 22, wire $v$, wire $w$, contact 161, finger 160, wire $j$, armature 11, wire $e$, finger 15, contact 18, and wires $i$ and $m$ to the negative side of the battery.

There is also a current established through the coils 95 and 96 as follows: from the positive side of the battery 20 to the wire $d$, wire $p$, wire $t$, contact 19, finger 16, wire $h$, wire $b$, wire $o$, wire $x$, coil 95, wire $y$, coil 96, wire $z$, wire $w$, contact 161, finger 160, wire $j$, armature 11, wire $e$, finger 15, contact 18 and wires $i$ and $m$ to the negative side of the battery. Also, the magnet 71 will be energized just as it was when the signal rail was positively energized only the flow of the current through the coils will be reversed.

If the signal rail 2 is deenergized, when the parts are as shown in Figure 1, the holding circuit from the local battery through the relay 10, will be broken because the contact between the shoe 6 and the contact 8 is broken and there is no current from the signal rail and therefore the circuit through the relay is broken, therefore, as there is no current through this relay, the electromagnet 71 and coils 95 and 96 will become deenergized. There will, however, be a holding circuit established from the local battery 20 through the danger signal 23, or red light, as follows: from the positive side of the battery to the wire $d$, contact 17, finger 15, wire $e$, armature 11, contact 14, wire $aa$, red light 23, wire $ab$, wire $c$, wire $b$, wire $h$, finger 16, contact 18, and wires $i$ and $m$ to the negative side of the battery.

It may also be said that whenever the speed of the train is such that the sleeve 35 of the governor is lifted, and causes the flange 36 to lift the fork 88 of the arm 85 then the contacts 91 and 93 will touch and the bell 80 will be caused to ring by reason of the closing of the circuit from the positive side of the battery 20 to the wire $d$, wire $p$, contacts 93 and 91, wire $ac$, magnet 81, and wires $s$ and $m$ to the negative side of the battery.

The cam 47 represents a curve of rates of permissible speeds for the car. When it is rotated by means of its shaft 45 through the gear 48 and pinion 62 it contacts with the roller 86 of the arm 85 and pushes down that arm. The actual speed of the car is of course indicated by the position of the flange 36 on the sleeve 35. When the flange and fork are moved relatively towards each other, it will occur if the movement is sufficient that the contacts 93 and 91 will touch to make a circuit through the magnet 81 and ring the bell 80. If the movement is continued, so that the contacts 92 and 90 are separated, then the electromagnet 75 will become deenergized and the valve 5 will be opened under the influence of the spring 78, the air will escape from the train pipe 72 and the air will be applied to retard the train. If, however, when the bell rings, the operator reduces his speed so that the flange 36 will move downwardly along the shaft 31, then the contacts 90 and 92 will not be separated, and the brakes will not be put on.

Let us suppose that the signal rail is positively energized, then the green light or clear signal 21 will be displayed. The magnet 71 will be energized and the armature 69 carrying the bearing 61 will be attracted so that the shaft 25 will be lifted and the pinion 62 will be moved out of mesh with the gear 48. Therefore the permissible speed cam will not be rotated, the arm 85 will remain in its maximum position and the operator can drive the train as fast as he pleases until its actual speed causes the flange 36 of the governor sleeve 35 to move so that the contacts 91 and 93 will touch, when the warning bell will be rung and if the speed is further increased the contacts 90 and 92 will be separated so that the circuit through the magnet 75 will be broken and the brakes will be put on.

This is equivalent to saying that so long as the speed does not exceed the maximum permissible speed denoted by the position of the arm 85 when the cam 47 has not been rotated, (that is, while the green light or clear signal is displayed) the speed of the train is entirely under the control of the operator.

Let us suppose that the signal rail 2 is negatively energized. Then, as before described, the yellow light or caution signal is displayed. The electromagnet 71 still being energized, the pinion 62 will be held out of mesh with the gear 48 just as when the clear signal was displayed. But, as has been described, the coils 95 and 96 will have become energized. This causes a rotation of the Z-armature 51. As stated above, the magnets are so arranged that this is a slow rotation and takes an appreciable increment of time. When such action has taken place, however, it will have moved the shaft 45 to the position indicated in Figure 2, and consequently will have moved the cam 47 to an intermediate or submaximum position against the roller 86 on the arm 85 to press down this arm so that the flange 36 does not have to move the same distance to contact with the fork 88 as it did when the clear signal was displayed and the cam 47 was at its maximum position. If now the actual speed approaches the submaximum rate in accordance with the position of the cam 47, then the contacts 91 and 93 will be brought together to ring the bell 80 and the contacts 90 and 92 separated to put on the brakes.

If the signal rail 2 is deenergized, then the red light or danger signal will be displayed, and the electromagnet 71 becoming deenergized, the pinion 62 will drop into mesh with the gear 48 and cause the immediate rotation of the shaft 45 and cam 47, and consequently a constantly diminishing permissible speed will be indicated. If the actual speed is not kept under such permissible speed, the make and break circuits will be operated as before, the bell 80 will ring and the brakes will be put on.

If the yellow light is displayed and the cam 47 is at its submaximum position, and a signal rail which is deenergized is reached, then the magnet 71 will be deenergized, the pinion 62 will drop into mesh with the gear 48, and the shaft 45 and cam 47 will be rotated from the submaximum position.

When the minimum position of the cam 47 is reached, indicating a minimum permissible speed, unless such speed is zero, the train can proceed under the control of the operator as long as the minimum is not exceeded. It will be noted that as the cam 47 is moved by intermediate power transmitting connections, from the governor shaft, and that this in turn is rotated from the wheel axle, the train must move a certain distance before the cam 47 is rotated from its maximum speed indicating position to its submaximum speed indicating position, and its minimum speed indicating position. Just how much these distances are in terms of linear measure is determined by the size and contour of the edge of the cam and can be varied to suit different conditions of service.

While in the foregoing the signal rails have been described as positively or negatively energized or deenergized by means of suitable switch controlled conductors operated from a central point, as a train dispatcher's office, it will be understood of course that they may be energized and deenergized in any other suitable manner as for instance through continuous track circuits without departing from the principle of the invention.

I claim:

1. In a railway signal system, signal rails arranged along the track and adapted to be energized positively or negatively, or deenergized, an electromagnet on the vehicle, three signals on the vehicle, connections between them and the electro-magnet whereby one signal is displayed when the electro-magnet is positively energized, a second signal is displayed when it is negatively energized, and a third signal is displayed when it is deenergized, a device on the vehicle moving in accordance with its actual speed, means whereby the vehicle may be retarded, a device on the vehicle to determine a permissible speed for the vehicle and adapted when actuated to move from a higher speed position to a lower speed position, means for actuating the permissible speed device from the actual speed device through power-transmitting mechanism, electrical connections brought into play to actuate the retarding device whenever the actual speed equals the permissible speed, and means for interrupting the function of the said power-transmitting mechanism whenever the electro-magnet on the vehicle is energized.

2. In a railway signal system, signal rails arranged along the track and adapted to be energized positively or negatively, or deenergized, an electro-magnet on the vehicle, three signals on the vehicle, connections between them and the electro-magnet whereby one signal is displayed when the electro-magnet is positively energized, a second signal is displayed when it is negatively energized, and a third signal is displayed when it is deenergized, a device on the vehicle moving in accordance with its actual speed, means whereby the vehicle may be retarded, a device on the vehicle to determine a permissible speed for the vehicle and adapted when actuated to move from a higher speed position to a lower speed position, means for actuating the permissible speed device from the actual speed device through power-transmitting mechanism, electrical connections brought into play to actuate the retarding device whenever the actual speed equals the permissible speed, means for interrupting the function of the said power-transmitting mechanism whenever the electro-magnet on the vehicle is energized, and restoring or maintaining such function when it is deenergized.

3. In a railway signal system, signal rails arranged along the track and adapted to be energized positively or negatively, or deenergized, an electro-magnet on the vehicle, three signals on the vehicle, connections between them and the electro-magnet whereby one signal is displayed when the electro-magnet is positively energized, a second signal is displayed when it is negatively energized, and a third signal is displayed when it is deenergized, a device on the vehicle moving in accordance with its actual speed, means whereby the vehicle may be retarded, a device on the vehicle to determine a permissible speed for the vehicle and adapted when actuated to move from a higher speed position to a lower speed position, means for actuating the permissible speed device from the actual speed device through power-transmitting mechanism, electrical connections brought into play to actuate the retarding device whenever the actual speed equals the permissible speed, and means for interrupting the function of the said power-transmitting mechanism whenever the electro-magnet on the vehicle is energized, in combination with a local holding circuit on the vehicle adapted automatically to maintain the electro-magnet in the same electrical condition which had been produced by the impulse received from the signal rail until the vehicle reaches another signal rail.

4. In a railway signal system, signal rails arranged along the track and adapted to be energized positively or negatively, or to be deenergized, an electro-magnet on the vehicle, a clear signal adapted to be displayed when the electro-magnet is positively energized, a caution signal when it is negatively energized, and a danger signal when it is deenergized, means on the vehicle adapted to determine its actual speed and a brake, in combination with a device on the vehicle adapted to determine a permissible speed therefor, power-transmitting connections between such device and the running gear of the vehicle, and means for interrupting the function of such connections whenever the electro-magnet is energized and maintaining such function whenever it is deenergized.

5. In an apparatus of the character described, a brake, an actual speed device, a permissible speed device, means automatically adapted when the actual speed exceeds the permissible speed to bring the parts together to actuate the brake, and means adapted to move the permissible speed device to a maximum position or a predetermined sub-maximum position and maintaining it at the latter position according as clear or caution conditions obtain along the track.

6. In an apparatus of the character described, a brake, an actual speed device, a permissible speed device, means automatically adapted when the actual speed exceeds the permissible speed to bring the parts together to actuate the brake, and means adapted to move the permissible speed device to a maximum position or a sub-maximum position according as clear or caution conditions obtain along the track, in combination with a warning signal, and means for automatically actuating the signal before the permissive speed indicator is moved to its sub-maximum position.

7. In a device of the character described, a permissible speed device and two optional means for respectively bringing it to a maximum or sub-maximum position according as clear or caution conditions obtain along the track.

8. In a device of the character described, a permissible speed device and two optional means for respectively bringing it to a maximum or sub-maximum position according as clear or caution conditions obtain along the track, both optional means being automatic.

9. In a railway signal system, signal rails arranged along the track and adapted to be energized positively or negatively, or to be deenergized, an electro-magnet on the vehicle, a clear signal adapted to be displayed when the electro-magnet is positively energized, a caution signal when it is negatively energized, and a danger signal when it is deenergized, means on the vehicle adapted to determine its actual speed and a brake, in combination with a device on the vehicle adapted to determine a permissible speed therefor, power-transmitting connections between such device and the running gear of the vehicle, and means for interrupting the function of such connections whenever the electro-magnet is energized and maintaining such function whenever it is deenergized, in combination with means for setting the permissible speed device at a maximum condition when a clear signal is indicated on the vehicle and at a sub-maximum condition when a caution signal is indicated on the vehicle.

10. In a device of the character described, a permissible speed device including a shaft, power-transmitting connections between it and the running gear of the vehicle, clear, caution and danger signals, means for interrupting the function of the power-transmitting connections when clear and caution signals are displayed and restoring such function when a danger signal is displayed, and means for setting the permissible speed device at a maximum when a clear signal is displayed and at a sub-maximum when a caution signal is displayed.

11. In a device of the character described, a permissible speed device including a shaft, power-transmitting connections between it and the running gear of the vehicle, clear, caution and danger signals, means for interrupting the function of the power-transmitting connections when clear and caution signals are displayed and restoring such function when a danger signal is displayed, and means for setting the permissible speed device at a maximum when a clear signal is displayed and at a sub-maximum when a caution signal is displayed, in combination with means for arresting the revolution of the shaft when a minimum setting has been arrived at.

12. The combination with a vehicle of a shaft rotating in accordance with its actual speed, a permissible speed device including a shaft and a cam revolving therewith, power-transmitting connections between the first-named shaft and the second, means for normally interrupting the function of such connections, means for restoring such functions governed by conditions outside of the vehicle, a stop for limiting the movement of the cam shaft, and a slipping device in the power-transmitting connections whereby when the cam shaft has revolved a predetermined distance and its rotation is arrested the first-named shaft may continue to revolve.

13. The combination with a vehicle, of a permissible speed device, and two means for effecting the operation of the permissible speed device, electro-magnets carried by the vehicle for controlling said two means, one means adapted to secure the rotation of the device from a maximum point and the other means adapted to secure its rotation from a sub-maximum point.

14. The combination with a vehicle of a shaft rotating in accordance with its actual speed, a permissible speed device including a shaft and a cam revolving therewith, power-transmitting connections between the first-named shaft and the second, means for normally interrupting the function of such connections, means for restoring such functions including an electro-magnet, and means for energizing it both inside of and outside of the vehicle, and means for stopping the rotation of the cam shaft after it has been moved a predetermined distance to a minimum speed condition.

15. The combination with a vehicle of a shaft rotating in accordance with its actual speed, a permissible speed device including a shaft and a cam revolving therewith, means for actuating the latter shaft including power-transmitting connections between the first-named shaft and the second, and two means for controlling the operation of the second shaft, both means being controlled from electro-magnets carried by the vehicle, one means adapted to secure the rotation of the cam shaft from a maximum point and the other means adapted to secure its rotation from a sub-maximum point, and means for stopping the rotation of the cam shaft after it has been moved a predetermined distance to a minimum speed position.

16. The combination with a vehicle of a shaft rotating in accordance with its actual speed, a permissible speed device including a shaft and a cam revolving therewith, power-transmitting connections between the first-named shaft and the second, means for normally interrupting the functions of such connections, means for restoring such functions including an electro-magnet, and means for energizing it both inside of and outside of the vehicle, and means for restoring the cam shaft automatically to its original position whenever the functions of its power-transmitting mechanism are interrupted.

17. The combination with a vehicle, of a shaft rotating in accordance with its actual speed, a permissible speed device including a shaft and a cam revolving therewith, means for actuating the latter shaft including power-transmitting connections between the first-named shaft and the second, and two means for controlling the operation of the second shaft, both means being controlled from electro-magnets carried by the vehicle, one means adapted to secure the rotation of the cam shaft from a maximum point and the other means adapted to secure its rotation from a sub-maximum point, and means for restoring the cam shaft automatically to its original position whenever the functions of its power-transmitting mechanism are interrupted.

18. The combination with a vehicle of a shaft rotating in accordance with its actual speed, a permissible speed device including a shaft and a cam revolving therewith, power-transmitting connections between the first-named shaft and the second, means for normally interrupting the function of such connections, means for restoring such functions including an electromagnet and means for energizing it both inside and outside of the vehicle, means for stopping the rotation of the cam shaft after it has been moved a predetermined distance to a minimum position, and means for restoring the cam shaft automatically to its original position whenever the functions of its power-transmitting mechanism are interrupted.

19. The combination with a vehicle of a shaft rotating in accordance with its actual speed, a permissible speed device including a shaft and a cam revolving therewith, means for actuating the latter shaft including power-transmitting connections between the first-named shaft and the second, and two means for controlling the operation of the second shaft, both means controlled from electro-magnets carried by the vehicle, one means adapted to secure the rotation of the cam shaft from a maximum point and the other means adapted to secure its rotation from a sub-maximum point, means for stopping the rotation of the cam shaft after it has been moved a predetermined distance to a minimum speed position, and means for restoring the cam shaft automatically to its original position whenever the functions of its power-transmitting mechanism are interrupted.

20. A system of control for moving vehicles, comprising means on the vehicle which moves in accordance with the actual speed of the vehicle, further means on the vehicle driven by the running gear thereof which moves in accordance with the permissible speed of such vehicle, means normally inactive adapted to retard the movement of the vehicle, means adapted to actuate such retarding means when the means on the vehicle moving in accordance with its actual speed is moved relatively to the means moving in accordance with its permissive speed beyond a predetermined limit, and means for automatically setting the permissive speed means at a maximum and sub-maximum position.

21. A system of control for moving vehicles, comprising means on the vehicle which moves in accordance with the actual speed of the vehicle, further means on the vehicle driven by the running gear thereof which moves in accordance with the permissive speed of such vehicle, means normally inactive adapted to retard the movement of the vehicle, means adapted to actuate such retarding means when the means on the vehicle moving in accordance with its actual speed is moved relatively to the means moving in accordance with its permissive speed beyond a predetermined limit, means for automatically setting the permissive speed means at a maximum and sub-maximum position, comprising electro-magnets adapted to be energized or deenergized automatically corresponding to danger or safety indications on the vehicle.

22. In a system for the control of moving vehicles, an actual speed device, a permissive speed device moved therefrom by an intermediate gearing, in combination with means for automatically throwing the gearing into mesh when certain conditions are received or obtain on the vehicle, means for automatically throwing it out of mesh, and other means for causing the operation of the permissive speed device when certain other conditions are received or obtain on the vehicle.

23. In a system for the control of moving vehicles, an actual speed device, a permissive speed device moved therefrom by an intermediate gearing, in combination with means for automatically moving the permissive speed device from a maximum to a sub-maximum position, which means include an electro-magnet, and means for holding it at such position until a change in the electrical condition of such magnet occurs and further means for moving it automatically to its original position or to a minimum position depending upon the nature of such change.

24. In a system for the control of moving vehicles, an actual speed device, a permissive speed device moved therefrom by an intermediate gearing, including a gear and pinion, means for automatically moving the permissive speed device from a maximum to a sub-maximum position when caution conditions obtain on the vehicle, and means for holding it at such sub-maximum position until danger conditions obtain, and further means then adapted to move the pinion into mesh with the gear.

25. In an apparatus of the character described, a permissive speed device adapted by its movement to establish a predetermined gradually reduced speed, means for moving it from a maximum to a minimum position, an electro-magnet controlling said means, means for effecting the motion of the device to an intermediate position, and a second electro-magnet controlling the last mentioned means.

26. The combination with a vehicle and a permissive speed device carried thereby, of means for effecting the operation of the device to move said device toward a minimum speed position when danger conditions exist, and means for limiting such movement to a point short of the minimum speed position when caution conditions exist.

27. The combination with a vehicle and a permissive speed device carried thereby, of means for effecting the operation of the device to move said device toward a minimum speed position when danger conditions exist, and other means for moving the device toward the minimum speed position when caution conditions exist, the range of operation of the latter moving means being less than that of the first mentioned means.

28. The combination with a vehicle, of a permissive speed device, two means for moving the device, said means respectively having different limits to the amount of movement imparted to the device, and means for causing the operation of the device by one or the other of said moving means accordingly as different conditions exist.

29. The combination with a vehicle, of a permissive speed device, a means for moving the device between maximum and minimum speed positions, another means for giving a less extended range of movement to the device, and means dependent on danger conditions for setting the first means into action and dependent on caution conditions for setting the second means into action.

30. The combination with a vehicle, of a permissive speed device, means for moving the device between maximum and minimum speed positions, another means for moving the device between such maximum speed position and a limit that lies between said maximum speed indicating position and said minimum speed position, and means dependent on danger conditions for setting the first means into operation and dependent on caution conditions for setting the second means into action.

31. In a system of control for vehicles movable upon a trackway, in combination: a vehicle; a trackway; means on the vehicle conditioned by means on the trackway for establishing a maintained maximum permissible speed and a maintained sub-maximum permissible speed for the vehicle and means for utilizing said first mentioned means for controlling the vehicle.

32. In a system of control for vehicles movable upon a trackway; in combination: a vehicle, a trackway; means on the vehicle conditioned by means on the trackway for establishing over different portions of the trackway different maintained maximum permissible speeds for the vehicle and means for utilizing said first mentioned means for controlling the vehicle.

33. In a system of control for moving vehicles, in combination: a vehicle; means on the vehicle conditioned by means on the roadway for establishing on the vehicle different persisting maximum permissible speeds for the vehicle and means for utilizing said first mentioned means for controlling the vehicle.

34. In a system of control for moving vehicles, in combination: a vehicle; means on the vehicle driven by the running gear thereof which moves in accordance with actual speed thereof; means on the vehicle for establishing different predetermined persisting permissible speeds; means on the roadway for actuating said last named means; a brake and means for actuating said brake by the co-operation of the first and the second mentioned means.

35. A railway system embodying means for producing a clearance current for a maximum speed and a different current for a sub-maximum speed, means biased to retard the train and thrown out of operation by said clearance current and means for producing a sub-maximum speed responsive to said sub-maximum speed current.

36. In a system of control for vehicles movable upon a trackway, in combination: a vehicle; a trackway; means on the vehicle conditioned by means on the trackway for establishing a maintained maximum permissible speed and a maintained sub-maximum permissible speed for the vehicle; means for at times connecting said first mentioned means to the running gear of the vehicle to be operated thereby so as to establish a gradually reducing maximum permissible speed and means for utilizing said first mentioned means for controlling the vehicle.

37. In a system of control for vehicles movable upon a trackway, in combination: a vehicle; a trackway; means on the vehicle conditioned by means on the trackway for establishing over different portions of the trackway different maintained maximum permissible speeds for the vehicle; means for at times connecting said first mentioned means to the running gear of the vehicle to be operated thereby so as to establish a gradually reducing maximum permissible speed and means for utilizing said first mentioned means for controlling the vehicle.

38. In a system of control for moving vehicles, in combination: a vehicle; a roadway; means on the vehicle conditioned by means on the roadway for establishing on the vehicle different persisting maximum permissible speeds for the vehicle; means for at times connecting said first mentioned means to the running gear of the vehicle to be operated thereby so as to establish a gradually reducing maximum permissible speed and means for utilizing said first mentioned means for controlling the vehicle.

39. In a system of control for moving vehicles, in combination: a vehicle; a roadway; means on the vehicle driven by the running gear thereof which moves in accordance with the actual speed thereof; means on the vehicle for establishing different predetermined persisting permissible speeds; means for at times connecting said second mentioned means to the running gear of the vehicle to be operated thereby so as to establish a gradually reducing maximum permissible speed; means on the roadway for actuating said second and third named means; a brake and means for actuating said brake by the cooperation of the first and the second mentioned means.

40. In a system of control for vehicles movable upon a trackway; in combination: a vehicle; a trackway for the vehicle; means on the vehicle adapted to be conditioned for establishing a maintained maximum permissible speed and a maintained sub-maximum permissible speed for the vehicle; electromagnetic means on the vehicle for conditioning the first mentioned means; means on the trackway for governing the second mentioned means; means for at times connecting said first mentioned means to the running gear of the vehicle to be operated thereby so as to establish a gradually reducing maximum permissible speed and means for utilizing said first mentioned means for controlling the vehicle.

41. In a system for automatically controlling the speed of railway vehicles, in combination: automatic speed controlled apparatus on the vehicle including a permissive speed element adapted to assume different initial conditions; means tending to cause said permissive speed element to assume a predetermined initial condition; an electromagnetic device operable to cause said permissive speed element to change to another initial condition; a circuit for controlling said device and means partly on the vehicle and partly along the track for controlling said circuit.

42. In a system of control for vehicles movable upon a trackway, in combination; a vehicle; a trackway; means on the vehicle conditioned by means on the trackway for initially establishing a maintained maximum permissible speed or a maintained submaximum permissible speed for the vehicle; means for at times connecting said first mentioned means to the running gear of the vehicle to be operated thereby so as to establish a maximum permissible speed gradually reducing from either of the initially established permissible speeds according to which is initially established and means for utilizing said first mentioned means for controlling the vehicle.

43. In a system of control for vehicles movable upon a trackway, in combination; a vehicle; a trackway; means on the vehicle conditioned by means on the trackway for initially establishing over different portions of the trackway different maintained maximum permissible speeds for the vehicle; means for at times connecting said first mentioned means to the running gear of the vehicle to be operated thereby so as to establish a maximum permissible speed gradually reducing from any initially established maintained maximum permissible speed according to which is initially established and means for utilizing said first mentioned means for controlling the vehicle.

44. In a system of control for moving vehicles, in combination; a vehicle; a roadway; means on the vehicle driven by the running gear thereof which moves in accordance with the actual speed therof; means on the vehicle for initially establishing different predetermined persisting permissible speeds; means for at times connecting said second mentioned means to the running gear of the vehicle to be operated thereby so as to establish a maximum permissible speed gradually reducing from any predetermined persisting permissible speed according to which is initially established; means on the roadway for actuating said second and third named means; a brake and means for actuating said brake by the cooperation of the first and second mentioned means.

45. In a system of control for vehicles movable upon a trackway, in combination; a vehicle; a trackway for the vehicle; means on the vehicle adapted to be conditioned for initially establishing a maintained maximum permissible speed and a maintained submaximum permissible speed for the vehicle; electro-magnetic means on the vehicle for conditioning the first mentioned means; means on the trackway for governing the second mentioned means; means for at times connecting said first mentioned means to the running gear of the vehicle to be operated thereby so as to establish a maximum permissible speed gradually reducing from either of the initially established permissible speeds according to which is initially established and means for utilizing said first mentioned means for controlling the vehicle.

46. Railway traffic controlling apparatus comprising means on a vehicle controlled from the trackway for permitting maximum speed under clear traffic conditions in advance and for applying the brakes if the vehicle exceeds a fixed submaximum speed limit under restrictive traffic conditions in advance, and slow-acting means on the vehicle set into operation when an indication of restrictive traffic conditions is received for preventing operation of said brake-applying means for a variable distance of vehicle travel depending on the speed of the vehicle.

47. Railway traffic controlling apparatus comprising means on a vehicle controlled from the trackway for applying the brakes if the vehicle exceeds a fixed sub-maximum speed limit under restrictive traffic conditions, and slow-acting means on the vehicle set into operation when a restrictive indication is received for preventing operation of said brake-applying means for a variable distance of vehicle travel depending on the speed of the vehicle.

48. Railway traffic controlling apparatus comprising means on a vehicle controlled from the trackway and operative when a restrictive indication is received to determine a fixed sub-maximum speed limit, a brake application device controlled by said means and set into operation if the vehicle exceeds said speed limit, and apparatus interposed between said means and said device for preventing application of the brakes for a variable distance of vehicle travel depending on the speed of the vehicle.

49. Railway traffic controlling apparatus comprising means on a vehicle controlled from the trackway for giving a caution indication and a danger indication, apparatus on the vehicle for applying the brakes if the vehicle exceeds a fixed sub-maximum speed when the caution indication is received, and a lower fixed sub-maximum speed when the danger indication is received, and slow-acting means set into operation when either of said indications is received for delaying the brake application for a variable distance interval of vehicle travel depending on the speed of the vehicle.

50. Railway traffic controlling apparatus comprising means on a vehicle controlled from the trackway for determining a fixed sub-maximum speed limit under restrictive traffic conditions, slow-acting apparatus set into action when a restrictive indication is received on the vehicle and requiring for its operation a variable distance of vehicle travel depending on the speed of the vehicle, and a device on the vehicle for applying the brakes when the operation of said slow-acting apparatus is completed if the speed of the vehicle then exceeds said fixed limit.

51. Railway traffic controlling apparatus comprising a railway vehicle, means thereon controlled by traffic conditions in advance for imposing a fixed intermediate speed limit and a fixed low speed limit, brake application apparatus controlled by said means for applying the brakes if the vehicle exceeds said speed limits, and slow-acting means interposed between said means and said apparatus for delaying the operation of said brake application apparatus for a distance interval which depends upon the speed of the vehicle.

52. Railway traffic controlling apparatus comprising a vehicle, means thereon responsive to dangerous traffic conditions in advance for imposing a fixed speed limit on the vehicle, brake application apparatus controlled by said means for applying the brakes if the vehicle exceeds said fixed speed limit, and slow-acting means interposed between said means and said apparatus for preventing application of the brakes for a variable distance of vehicle travel depending on speed.

53. Railway traffic controlling apparatus comprising means on a vehicle controlled from the trackway for permitting maximum speed under clear traffic conditions, a sub-maximum speed under predetermined restrictive conditions and a minimum speed under other predetermined restrictive conditions and for applying the brakes if the vehicle exceeds a fixed sub-maximum speed under one predetermined restrictive condition or a minimum speed under the other predetermined restrictive condition and slow-acting means on the vehicle set into operation when an indication of sub-maximum speed predetermined restrictive conditions or an indication of minimum speed restrictive conditions is received for preventing operation of said brake applying means for a variable distance of vehicle travel depending on the speed of the vehicle.

In testimony whereof I affix my signature.

PAUL J. SIMMEN.